United States Patent
Fear

(10) Patent No.: US 10,249,018 B2
(45) Date of Patent: Apr. 2, 2019

(54) GRAPHICS PROCESSOR AND METHOD OF SCALING USER INTERFACE ELEMENTS FOR SMALLER DISPLAYS

(71) Applicant: Nvidia Corporation, Santa Clara, CA (US)

(72) Inventor: Andrew Fear, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 606 days.

(21) Appl. No.: 13/870,430

(22) Filed: Apr. 25, 2013

(65) Prior Publication Data

US 2014/0325367 A1  Oct. 30, 2014

(51) Int. Cl.
- *G06T 3/00* (2006.01)
- *G06F 3/048* (2013.01)
- *G06F 9/451* (2018.01)
- *G06F 9/44* (2018.01)

(52) U.S. Cl.
CPC ............ *G06T 3/0012* (2013.01); *G06F 3/048* (2013.01); *G06F 9/4443* (2013.01); *G06F 9/451* (2018.02)

(58) Field of Classification Search
CPC .......... H04L 29/0809; H04L 29/08072; G06F 17/30873; G06F 17/30899; G06F 3/14; G06F 11/3447; G06F 3/048; G06F 9/451; G06F 9/4443; G06Q 30/02; G06T 15/005; G06T 2210/52; G06T 15/00; G06T 2200/28; G06T 3/0012
See application file for complete search history.

(56) References Cited

U.S. PATENT DOCUMENTS

| | | | |
|---|---|---|---|
| 2004/0189677 A1* | 9/2004 | Amann | G06F 3/1454 345/660 |
| 2009/0058885 A1* | 3/2009 | Park et al. | 345/668 |
| 2009/0225076 A1* | 9/2009 | Vlietinck | G06T 15/005 345/419 |
| 2010/0091012 A1* | 4/2010 | Newton et al. | 345/419 |
| 2011/0086706 A1* | 4/2011 | Zalewski | 463/36 |
| 2011/0187736 A1* | 8/2011 | Zimmer | G06T 1/20 345/589 |
| 2012/0013718 A1* | 1/2012 | Mizutani | H04N 13/0022 348/54 |
| 2012/0076197 A1* | 3/2012 | Byford | H04N 19/00 375/240.01 |
| 2012/0106930 A1* | 5/2012 | Amin | H04N 21/443 386/278 |
| 2012/0166985 A1* | 6/2012 | Friend et al. | 715/765 |
| 2012/0280901 A1* | 11/2012 | Kim | 345/156 |
| 2012/0284632 A1* | 11/2012 | Baird | G06F 9/4445 715/749 |

(Continued)

*Primary Examiner* — Tadesse Hailu
(74) *Attorney, Agent, or Firm* — Kevin Brown; Parker Justiss, P.C.

(57) ABSTRACT

A graphics processor and a method of scaling user interface (UI) elements for smaller displays. One embodiment of the graphics processor includes: (1) a scene renderer configured to render a scene from scene data generated by a graphics application, (2) a user interface (UI) renderer configured to render a UI from UI data generated by the graphics application, (3) a UI scaler configured to scale the UI based on properties of a remote display, and (4) a compositor operable to combine the scene and the UI into a composite image.

16 Claims, 2 Drawing Sheets

(56) References Cited

U.S. PATENT DOCUMENTS

| | | | |
|---|---|---|---|
| 2013/0111330 A1* | 5/2013 | Staikos | G06F 17/21 |
| | | | 715/241 |
| 2013/0159893 A1* | 6/2013 | Lewin | G06F 9/4443 |
| | | | 715/762 |
| 2013/0229414 A1* | 9/2013 | Gruber | G06T 15/40 |
| | | | 345/426 |
| 2013/0293537 A1* | 11/2013 | Gaude | G06T 13/20 |
| | | | 345/419 |

* cited by examiner

GRAPHICS PROCESSOR AND METHOD OF SCALING USER INTERFACE ELEMENTS FOR SMALLER DISPLAYS

TECHNICAL FIELD

This application is directed, in general, to cloud rendering and, more specifically, to scaling user interface (UI) elements according to client screen size.

BACKGROUND

The utility of personal computing was originally focused at an enterprise level, putting powerful tools on the desktops of researchers, engineers, analysts and typists. That utility has evolved from mere number-crunching and word processing to highly programmable, interactive workpieces capable of production level and real-time graphics rendering for incredibly detailed computer aided design, drafting and visualization. Personal computing has more recently evolved into a key role as a media and gaming outlet, fueled by the development of mobile computing. Personal computing is no longer resigned to the world's desktops, or even laptops. Robust networks and the miniaturization of computing power have enabled mobile devices, such as cellular phones and tablet computers, to carve large swaths out of the personal computing market. Desktop computers remain the highest performing personal computers available and are suitable for traditional businesses, individuals and gamers. However, as the utility of personal computing shifts from pure productivity to envelope media dissemination and gaming, and, more importantly, as media streaming and gaming form the leading edge of personal computing technology, a dichotomy develops between the processing demands for "everyday" computing and those for high-end gaming, or, more generally, for high-end graphics rendering.

The processing demands for high-end graphics rendering drive development of specialized hardware, such as graphics processing units (GPUs) and graphics processing systems (graphics cards). For many users, high-end graphics hardware would constitute a gross under-utilization of processing power. The rendering bandwidth of high-end graphics hardware is simply lost on traditional productivity applications and media streaming. Cloud graphics processing is a centralization of graphics rendering resources aimed at overcoming the developing misallocation.

In cloud architectures, similar to conventional media streaming, graphics content is stored, retrieved and rendered on a server where it is then encoded, packetized and transmitted over a network to a client as a video stream (often including audio). The client simply decodes the video stream and displays the content. High-end graphics hardware is thereby obviated on the client end, which requires only the ability to play video. Graphics processing servers centralize high-end graphics hardware, enabling the pooling of graphics rendering resources where they can be allocated appropriately upon demand. Furthermore, cloud architectures pool storage, security and maintenance resources, which provide users easier access to more up-to-date content than can be had on traditional personal computers.

Perhaps the most compelling aspect of cloud architectures is the inherent cross-platform compatibility. The corollary to centralizing graphics processing is offloading large complex rendering tasks from client platforms. Graphics rendering is often carried out on specialized hardware executing proprietary procedures that are optimized for specific platforms running specific operating systems. Cloud architectures need only a thin-client application that can be easily portable to a variety of client platforms. This flexibility on the client side lends itself to content and service providers who can now reach the complete spectrum of personal computing consumers operating under a variety of hardware and network conditions.

SUMMARY

One aspect provides a graphics processor. In one embodiment, the processor includes: (1) a scene renderer configured to render a scene from scene data generated by a graphics application, (2) a UI renderer configured to render a UI from UI data generated by the graphics application, (3) a UI scaler configured to scale the UI based on properties of a remote display, and (4) a compositor operable to combine the scene and the UI into a composite image.

Another aspect provides a method of scaling UI elements. In one embodiment, the method includes: (1) receiving client data, (2) rendering the UI elements, and (3) scaling the UI elements based on the client data.

Yet another aspect provides a graphics server. In one embodiment, the graphics processor includes: (1) a network interface controller (NIC) couplable to a network, and configured to receive client data from the network and transmit a composite image, (2) a central processing unit (CPU) configured to execute an application, thereby generating scene data and UI data, and (3) a graphics processing unit (GPU), including: (3a) a scene renderer configured to render a scene from the scene data, (3b) a UI renderer configured to render a UI from the UI data, (3c) a UI scaler configured to scale the UI based on the client data, and (3d) a compositor operable to combine the scene and the UI to form the composite image.

BRIEF DESCRIPTION

Reference is now made to the following descriptions taken in conjunction with the accompanying drawings, in which.

DETAILED DESCRIPTION

Game developers generally develop games for an intended market, whether it is traditional in-home, immobile platforms such as the PC or game console, or mobile devices such as tablet computers and smart phones. Displays for traditional platforms are increasingly large, allowing game producers to scale their content accordingly. Larger screens and higher resolutions translate to large scenes and great detail. One critical component of the gaming experience is the user interface (UI). The UI is the user's door to the environment created by the gaming engine and rendered by the graphics subsystem. Common UI elements include heads-up displays (HUD), text and menus. UI elements are often rendered as bitmaps or vector graphics, while the game is rendered as a three-dimensional (3D) environment using a graphics programming language such as Microsoft® DirectX® or OpenGL. The two are combined into a composite image sometime before being displayed on a television or monitor.

In remote rendering, or cloud architectures, a graphics server executes the game application and renders the 3D environment and the UI, which is packed up and transmitted to a thin client over a network. The client unpacks the transmitted video and displays it for the user. The user can also interact with the game application through the client device.

It is realized herein that as client devices are miniaturized and the rendered content scaled accordingly, the UI becomes so small that it loses its utility and becomes a strain on the user. For example, a UI element that is 12 mm on a 27 inch LCD is reduced to 3 mm on a 7 inch LCD, and 2 mm on a 5 inch LCD. The effect is less apparent for PC users or even laptop users. However, many mobile devices have displays significantly smaller than typical laptop displays, which typically vary from 13-17 inches.

It is realized herein the UI for at least smaller displays should be scaled independent of the rendered scene. It is further realized herein the GPU can intercept rendered UI before it is composited with the rendered scene. Once intercepted, a UI scaler can use information gathered about the client device to scale the rendered UI such that it is not so small as to become useless. Client data, including user settings and display properties, is often collected by the cloud gaming server, or possibly another server that manages the cloud gaming environment. Given this client data, particularly the client display size, the UI scaler can use a predetermined algorithm or scaling curve to increase or decrease the size of the UI relative to the client display itself.

Before describing various embodiments of the graphics processor or method of scaling UI elements introduced herein, a remote rendering system within which the graphics processor or method may be embodied or carried out will be described.

Figure 1:
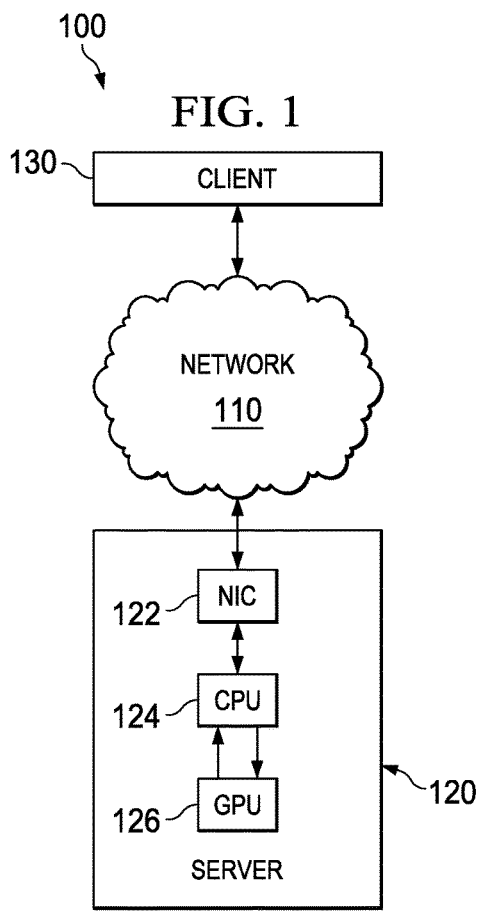
FIG. 1 is a block diagram of one embodiment of a remote rendering system.

FIG. 1 is a block diagram of one embodiment of a remote rendering system 100. System 100 includes a server 120 and a client 130 coupled together via a network 110. Server 120 represents the central repository of content, processing and rendering resources. Client 130 is a consumer of that content and those resources. Server 120 is freely scalable and has the capacity to provide that content and those services to many clients simultaneously by leveraging parallel and apportioned processing and rendering resources.

Server 120 includes a network interface card (NIC) 122, a central processing unit (CPU) 124 and a GPU 126. Upon request from Client 130, graphics content is recalled from memory via an application executing on CPU 124. As is convention for graphics applications, games for instance, CPU 124 reserves itself for carrying out high-level operations, such as determining position, motion and collision of objects in a given scene. From these high level operations, CPU 124 generates rendering commands that, when combined with the scene data, can be carried out by GPU 126. For example, rendering commands and data can define scene geometry, lighting, shading, texturing, motion, and camera parameters for a scene.

GPU 126 executes rendering procedures according to the rendering commands generated by CPU 124, yielding a stream of frames of video for the scene. Those raw video frames are captured and encoded, formatting the raw video stream for transmission, possibly employing a video compression algorithm such as the H.264 standard arrived at by the International Telecommunication Union Telecommunication Standardization Sector (ITU-T) or the MPEG-4 Advanced Video Coding (AVC) standard from the International Organization for Standardization/International Electrotechnical Commission (ISO/IEC). Alternatively, the video stream may be encoded into Windows Media Video® (WMV) format, VP8 format, or any other video encoding format.

CPU 124 prepares the encoded video stream for transmission, which is passed along to NIC 122. NIC 122 includes circuitry necessary for communicating over network 110 via a networking protocol such as Ethernet, Wi-Fi or Internet Protocol (IP), or possibly mobile network standards such as 4G, HSPA+ and LTE. NIC 122 provides the physical layer and the basis for the software layer of server 120's network interface. Client 130 receives the transmitted video stream for decoding and display. Client 130 can be a variety of personal computing devices, including: a desktop or laptop personal computer, a tablet, a smart phone or a television.

Having described a remote rendering system within which the graphics processor and method of scaling UI elements may be embodied or carried out, various embodiments of the graphics processor and method will be described.

Figure 2:
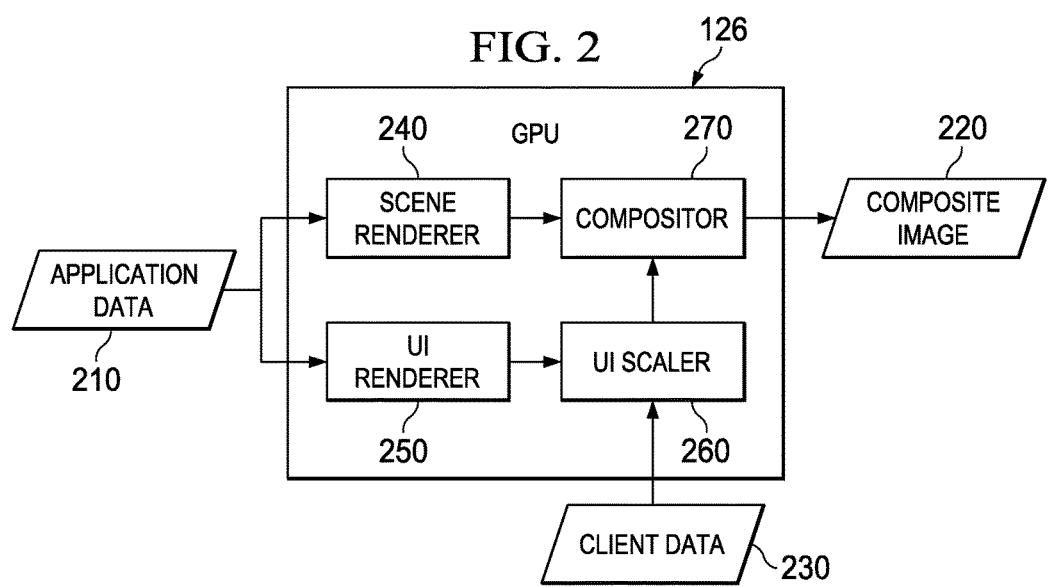
FIG. 2 is a block diagram of one embodiment of a graphics processor.

FIG. 2 is a block diagram of one embodiment of GPU 126 from FIG. 1. GPU 126 uses application data 210 and client data 230 as input, and generates a composite image 220 as output. Application data 210 includes both scene data and UI data and is generated by the execution of an application on a CPU. Client data 230 contains information about the client device that will ultimately display composite image 220. Client data 220 typically includes client display properties, such as display size, resolution, display type or model, and others. Display type could be in-plane switching (IPS), organic light-emitting diode (OLED), plane-to-line switching (PLS), multi-domain vertical alignment (MVA) or twisted nematic (TN), among others. Having the client display type or model allows certain assumptions as to how UI elements are rendered and scaled. Client data 220 can also include client user settings or any other information relevant to scaling UI elements.

GPU 126 includes a scene renderer 240, a UI renderer 250, a UI scaler 260 and a compositor 270. Scene renderer 240 employs application data 210 to render frames of the scene that can be captured and displayed. In one embodiment, scene renderer 240 is configured to render frames of an entire scene. In an alternative embodiment, scene renderer 240 is configured to render frames of only a portion of an entire scene, for example only the portion of the scene that UI elements would not occlude after compositing. UI renderer 250 uses application data 210 to render the various UI elements, such as a HUD or game menus. UI scaler 260 scales the rendered UI according to the scaling factors gleaned from client data 230. If client data 230 indicates the client device has a smaller display, elements of the UI are enlarged such that they appear bigger with respect to the rendered scene. Compositor 270 then combines the rendered scene and the scaled rendered UI into composite image 220.

Figure 3:
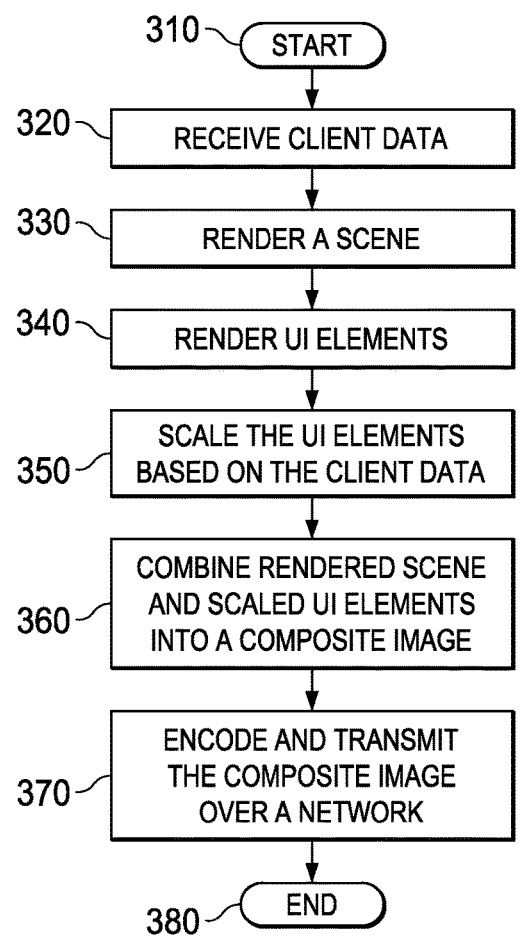
FIG. 3 is a flow diagram of one embodiment of a method of scaling UI elements.

FIG. 3 is a flow diagram of a method for scaling UI elements. The method begins in a start step 310. Client data is received in a step 320. Client data originates from a client device and can include display properties such as display size, resolution and display type, among others. In certain embodiments, client data also includes configuration settings and dynamic user settings. A variety of client devices are possible, including tablets, Smartphones, PCs and handheld gaming platforms. Client data may be sent directly by the client device or may be relayed by another computer to the computer carrying out rendering. For example, the computer carrying out rendering may be different than the server collecting data on the client device. In a step 330 a scene is rendered; and in a step 340 the UI elements are rendered. Depending on the application or game generating the graphics, the UI may include heads-up displays (HUD), text and menus, among others.

In a step 350, the UI elements rendered in step 340 are scaled based on the client data received at step 320. Native UI is generally rendered for large screens. As the client display gets smaller, the UI should be enlarged such that its utility is not diminished. Certain embodiments scale UI elements according to client display dimensions. Other embodiments may use dynamic user settings to scale UI elements.

Continuing the embodiment of FIG. 3, in a step 360 the rendered scene and the scaled rendered UI elements are combined to form composite image. The composite image is then encoded and transmitted over a network in a step 370. Alternate embodiments may omit the encoding and transmitting steps, if the client device is local. The method then ends in a step 380.

Those skilled in the art to which this application relates will appreciate that other and further additions, deletions, substitutions and modifications may be made to the described embodiments.

What is claimed is:

1. A graphics processor, comprising:
    a scene renderer configured to render a scene to provide a rendered scene from scene data generated by a graphics application for transmission over a network to a remote client device having a display screen associated therewith;
    a user interface (UI) renderer configured to render intercepted UI from UI data generated by said graphics application;
    a UI scaler configured to scale said UI independent of said rendered scene and before said UI is composited with said rendered scene, according to display size properties of said display screen to provide a scaled UI; and
    a compositor operable to combine said rendered scene and said scaled UI into a composite image displayable on said display screen of said remote client device.

2. The graphics processor recited in claim 1 wherein said UI scaler is configured to scale said UI to provide a scaled UI having display size element properties that are smaller or larger than display size element properties associated with said UI.

3. The graphics processor recited in claim 1 wherein said scaled UI includes a heads-up display (HUD) or a game menu.

4. The graphics processor recited in claim 1 wherein said UI data are transmitted to said graphics processor over said network by said remote client device.

5. The graphics processor recited in claim 4 wherein said graphics processor is couplable to a network interface controller (NIC) operable to receive said UI data from said remote client device over said network.

6. The graphics processor recited in claim 1 wherein said graphics processor is couplable to a central processing unit (CPU) operable to execute said graphics application, thereby generating said scene data and said UI data.

7. A method of scaling user interface (UI) elements, comprising:
    rendering a scene from scene data generated by a graphics application to provide a rendered scene for transmission over a network to a remote client device having a display screen associated therewith;
    intercepting and rendering UI elements from UI data generated by said graphics application; and
    scaling said UI elements independent of said rendered scene and before said UI is composited with said rendered scene and according to data of said remote client device to provide scaled UI elements;
    combining said rendered scene and said scaled UI elements into a composite image using a compositor; and
    displaying said composite image on said display screen.

8. The method recited in claim 7, further comprising receiving, prior to scaling, client data that indicates a screen size of said remote client device.

9. The method recited in claim 7, wherein said scaled UI elements includes a head-up display (HUD) or a game menu.

10. The method recited in claim 7 further comprising encoding and transmitting said composite image over a network.

11. The method recited in claim 10, wherein said rendered scene is rendered as a three-dimensional image and said scaled UI elements are rendered as a bitmap or vector graphics.

12. A graphics server, comprising:
    a network interface controller (NIC) couplable to a network, and configured to receive remote client data from said network and transmit a composite image to a remote client device;
    a central processing unit (CPU) configured to execute an application, thereby generating scene data and user interface (UI) data; and
    a graphics processing unit (GPU), comprising:
        a scene renderer configured to render a scene from said scene data generated by a graphics application to provide a rendered scene,
        a UI renderer configured to render intercepted UI from said UI data generated by said graphics application, said UI having a display size element properties associated therewith,
        a UI scaler configured to scale said UI independent of said rendered scene and before said UI is composited with said rendered scene, according to display size properties of said display screen to provide a scaled UI; and
        a compositor operable to combine said rendered scene and said scaled UI to form a composite image displayable on said screen of said remote client device.

13. The graphics server recited in claim 12 wherein said UI scaler is configured to scale said UI to provide a scaled UI having display size element properties that are smaller or larger than display size element properties associated with said UI.

14. The graphics server recited in claim 12 wherein said client data includes display dimensions, display type and display resolution for a remote tablet computer.

15. The graphics server recited in claim 12 wherein said application is a cloud gaming application.

16. The graphics server recited in claim 12 wherein said client data is collected by another server coupled to said network and transmitted to said graphics server.

* * * * *